United States Patent [19]

Takeda et al.

[11] Patent Number: 4,710,768

[45] Date of Patent: Dec. 1, 1987

[54] LIQUID CRYSTAL DISPLAY WITH SWITCHING TRANSISTOR FOR EACH PIXEL

[75] Inventors: Makoto Takeda, Tenri; Keisaku Nonomura, Nara; Kunihiko Yamamoto, Kitakatsuragi, all of Japan

[73] Assignee: Sharp Kabushiki Kaisha, Osaka, Japan

[21] Appl. No.: 660,005

[22] Filed: Oct. 11, 1984

[30] Foreign Application Priority Data

Oct. 13, 1983 [JP] Japan ................................ 58-192076

[51] Int. Cl.$^4$ ............................................. G09G 3/00
[52] U.S. Cl. ..................................... 340/805; 340/719; 340/784; 340/792
[58] Field of Search ............... 340/784, 805, 718, 719, 340/792; 350/330, 333

[56] References Cited

U.S. PATENT DOCUMENTS

| | | | |
|---|---|---|---|
| 4,356,483 | 10/1982 | Fujita et al. | 340/805 |
| 4,378,557 | 3/1983 | Murata | 340/805 |
| 4,393,380 | 7/1983 | Hosokawa et al. | 340/805 |
| 4,427,979 | 1/1984 | Choe et al. | 340/805 |
| 4,429,304 | 1/1984 | Fujita | 340/805 X |
| 4,532,506 | 7/1985 | Kitazima et al. | 340/805 X |
| 4,560,982 | 12/1985 | Sonehara et al. | 340/805 X |
| 4,571,585 | 2/1986 | Stein et al. | 340/805 X |

Primary Examiner—Marshall M. Curtis
Attorney, Agent, or Firm—Birch, Stewart, Kolasch & Birch

[57] ABSTRACT

A liquid crystal display device comprising display picture element electrodes connected to switching transistors formed at each crossing of the row and column electrodes of a matrix array with the opposite electrodes being opposite from the display picture element electrodes and across from the interfacing liquid crystal layer. Video signals are inverted into alternating positive/negative polarities for every field and applied to the column electrodes. A specific voltage that inverts its polarity in the same timing as the video signals is applied to the opposite electrodes. The drive method thus embodied by the present invention effectively minimizes the power consumption and allows for compensation of uneven display contrast effects.

3 Claims, 7 Drawing Figures

LIQUID CRYSTAL DISPLAY WITH SWITCHING TRANSISTOR FOR EACH PIXEL

BACKGROUND OF THE INVENTION

The present invention relates to a matrix liquid crystal display, more particularly, to the drive circuit of a matrix liquid crystal device incorporating switching transistors that are provided for each display picture element.

Conventionally, such a liquid crystal display device containing switching transistors directly connected to each display picture element set in the matrix liquid crystal display panel with a liquid crystal layer inserted between the display picture element electrodes and the opposite electrodes can achieve a high-quality display even when a multiplex drive is performed via multiple lines. Typically, such a configuration is shown as the equivalent circuit of FIG. 1. In FIG. 1, reference number 11 indicates switching transistors made of thinly filmed semiconductive material, being positioned at the crossing of the row electrodes 12 and the column electrodes 13. Each unit of the row electrode 12 and column electrode 13 is connected to a gate terminal and a source terminal, respectively. Reference number 14 indicates the liquid crystal layer capacitors each being inserted between the display picture element electrode connected to the drain terminal of the switching transistor 11 and the opposite electrode 15. However, if a capacitor storing charge is provided in parallel with the liquid crystal layer, reference number 14 will become the parallel capacitor for the liquid crystal layer and for storing charge as well.

In reference to the drive waveforms shown in FIG. 2, principles of the operation of the above liquid crystal display unit are described below. FIG. 2 (a) shows one of the scan pulses being applied to each row electrode 12, where the pulse sequentially activating each row of the switching transistor 11 being connected to each row electrode 12 is delivered to the switching transistor 11 via each row electrode 12. FIG. 2 (b) shows one of the video signal waveforms being applied to each column electrode 13, where a specific voltage is applied to the source terminal of the switching transistor 11 in response to the depth of the display in each column. Since an AC voltage is fed to the liquid crystal layer, video signals become pulsive waveforms with inverted fields of alternate polarity. We'll now look at the picture elements located at the crossing of the row electrode 12 that received the scan pulse shown in FIG. 2 (a) and the column electrode 13 that received the video signal wave form shown in FIG. 2 (b).

First, as soon as the switching transistor 11 turns ON upon receipt of the scan pulse in the period "t1", the liquid crystal layer 14 is charged via the switching transistor 11, thus providing the display picture element electrode connected to the drain terminal with the voltage V which is exactly the same as that of the video signal being fed to the source terminal. During a period from "t1" to "t2", the switching transistor 11 remains OFF to retain charge in the liquid crystal layer 14, causing the display picture element electrode to also retain the voltage V without varying its potential while the potential of the opposite electrode is constant. When the switching transistor 11 turns ON in the period "t2", the display picture element electrode is then charged up to the −V potential. When the switching transistor 11 turns OFF, this voltage is retained by this electrode. As a result, a specific voltage waveform is generated in the display picture element electrode as shown in FIG. 2 (c), stabilizing the potential of the opposite electrode 15 at a specific level, for example, zero volt. As a result, a rectangular waveform of the effective voltage can be applied to the liquid crystal layer 14. As described above, even when such a multiplex drive system is used by the liquid crystal display device containing switching transistors, the liquid crystal layer 14 can still receive a stable voltage equivalent to the static drive shown in FIG. 2 (c), thus achieving a satisfactory display. FIG. 3 shows the block diagram of a typical drive circuit of a liquid crystal display device containing switching transistors. In FIG. 3, reference number 21 indicates the liquid crystal display panel. Reference number 22 indicates a row electrode driver that outputs scan pulses to each row electrode. Reference number 23 indicates a column electrode driver that converts video signals that arrive at each column in series into parallel signals and simultaneously outputs these to each column electrode. Reference number 24 indicates a video signal processor circuit which, for example, converts TV broadcast video signals into specific waveforms suited for driving the liquid crystal. Reference numbers 25 and 26 respectively indicate amplifier circuits which, using switch 27, switch the inverted and non-inverted video signals before feeding these signals to the column electrode driver. Reference number 28 indicates the control circuit controlling these operations.

The power supplied to the liquid crystal display drive circuit is mainly consumed by analogue circuits such as the video signal processor circuit 24 and the amplifier circuits 25/26. Therefore, to effectively reduce the power consumption in the analogue circuits, the power voltage in these circuits should be lowered to the least level. Nevertheless, the amplitude of the video signal is dependent on the applicable voltage needed for properly driving the liquid crystals. In other words, since the amplitude can be determined by the display characteristics of the liquid crystals themselves, the existing drive system cannot lower the power voltage significantly nor achieve effective power savings. When using thin-film generating technology, to form the switching transistors on a transparent substrate with either a thin or thick film, temperatures may vary during the operation causing a variance in the physical characteristics of the made-up films. This effect is particularly troublesome when making up a large liquid crystal panel, since display contrast may become variable, too. To prevent this, the amplitude of the video signal amplifier circuit may be varied according to the varied characteristics of the transistors in order that variations may be properly compensated for. However, to provide the amplifier circuit with the corrective function, an extremely complex circuit is needed. Thus the problem competes with the goals of achieving compact size and minimum power consumption in these circuits.

OBJECT & SUMMARY OF THE INVENTION

To properly solve the above problems which are found in any conventional drive circuit of matrix liquid crystal display devices, the present invention has been achieved, which aims at providing an extremely useful liquid crystal display device that minimizes the power consumption and easily compensates for the incorrect display contrast effect. More particularly, the present invention relates to an active matrix liquid crystal display device, incorporating switching transistors provided for each picture element, which ensures high-quality display performance with an extremely wide visual angle even when a high-duty multiplex drive is underway. The present invention relates to the technology for driving the active matrix liquid crystal display device, featuring its advantageous competency for minimizing power voltage consumption by feeding a specific voltage to the opposite electrodes, with this voltage hvaing a polarity opposite from that of the video signals.

DETAILED DESCRIPTION OF THE INVENTION

Figure 1:
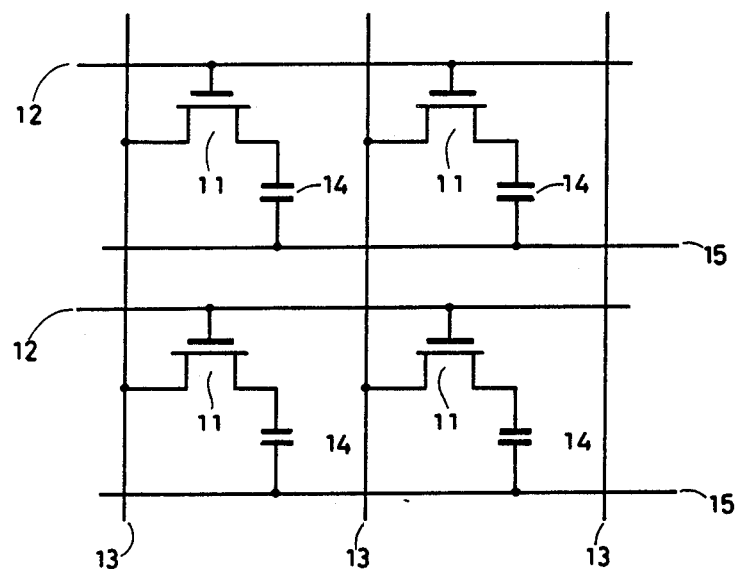
FIG. 1 shows the equivalent circuit of a matrix liquid crystal display device containing switching transistors.
Figure 2:
FIG. 2 shows the drive waveforms describing the operations of the equivalent circuit shown in FIG. 1.
Figure 2:
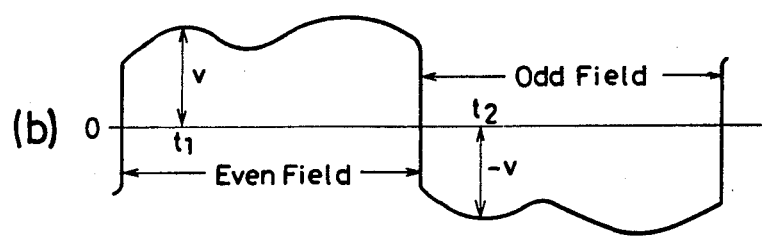
Figure 2:
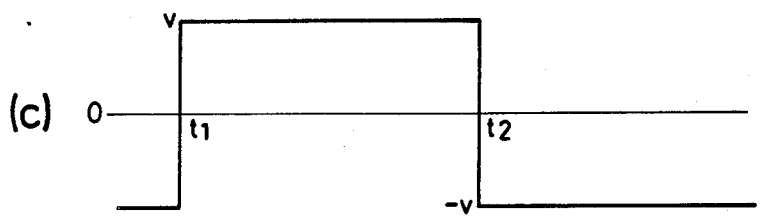
Figure 4:
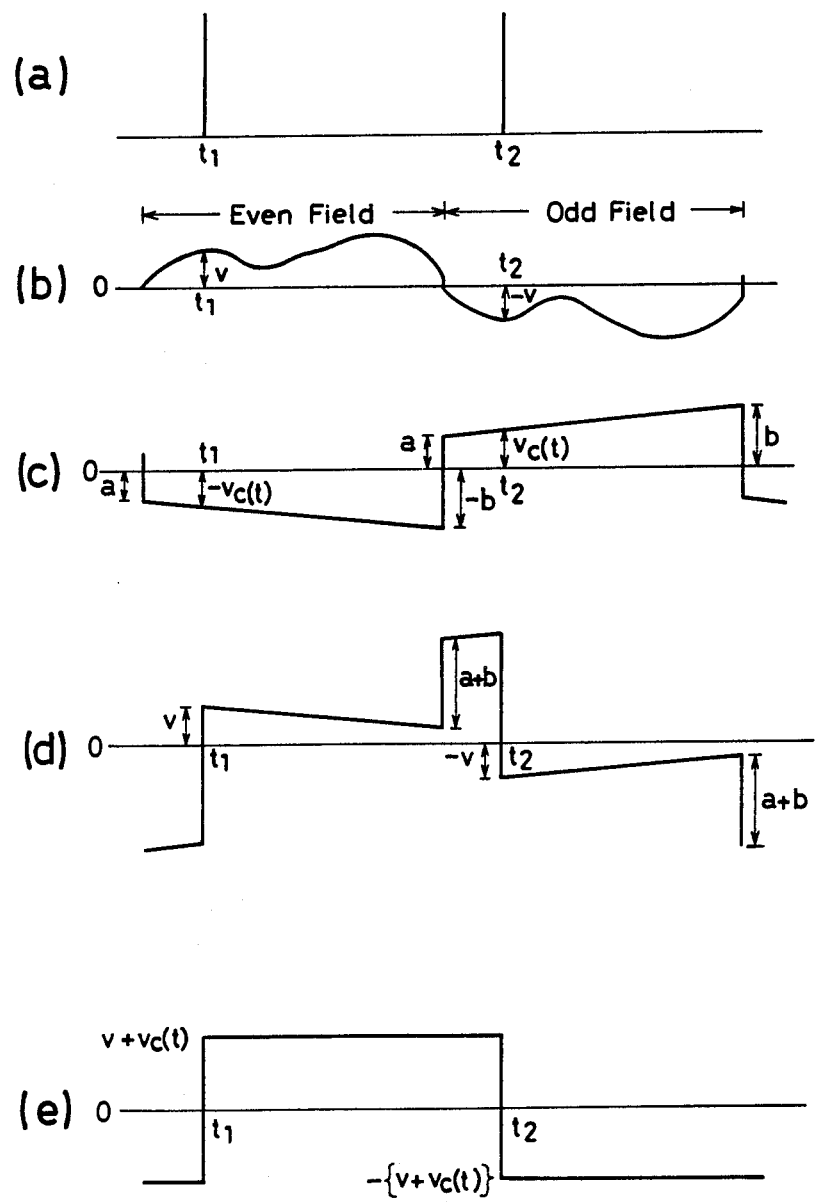
FIG. 4 shows the drive waveforms describing the operations of the drive circuit according to the preferred embodiment of the present invention.
Figure 3:
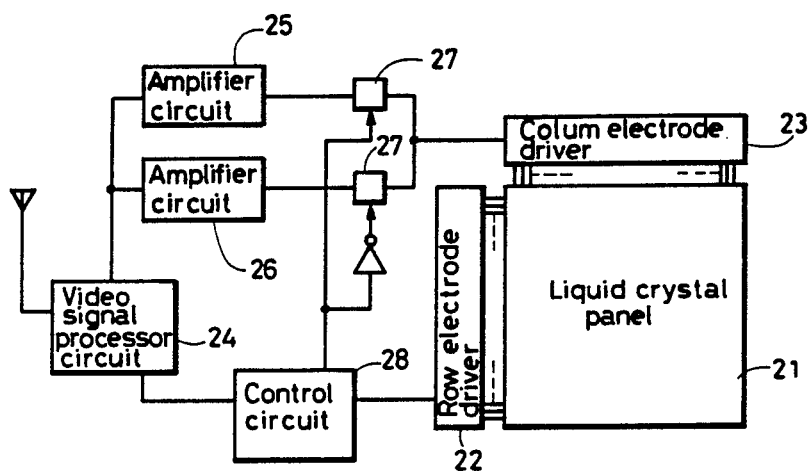
FIG. 3 shows the block diagram of the drive circuit of the matrix liquid crystal display device.
Figure 5:
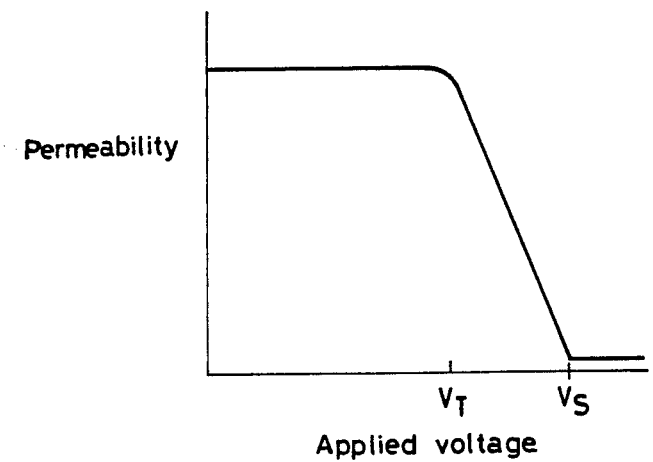
FIG. 5 shows the relationship between the applied voltage and the permeability of the liquid crystal display.

The drive circuit according to the preferred embodiment of the present invention features a function for applying the video signal to the column electrodes simultaneous with the delivery of a specific voltage waveform to the opposite electrodes, thus causing a differential voltage between these signals to be applied to the liquid crystal layer so that the amplitude of the video signal and the power consumption can be effectively minimized. In reference to the equivalent circuit and the drive waveforms respectively shown in FIGS. 1 and 4, the principle of these operations is described below. FIG. 4 (a) shows one of the scan pulses being applied to respective row electrodes, which is identical to the one generated by any conventional drive circuit. FIG. 4 (b) shows one of the video signal waveforms being fed to respective column electrodes, which is characteristically of alternating polarity, for every field. FIG. 4 (c) shows a voltage waveform being applied to the opposite electrode 15. To simplify the description, the waveforms representing a linearly variable voltage will be taken as an example. The waveform being applied to the opposite electrode 15 is also of alternating polarity for every field synchronous with the video signal waveforms. FIG. 4 (d) and (e) respectively show the potential of the display picture element electrode and the voltage applied to the liquid crystal layer. Now, we'll again look at the picture element located at the crossing of the row electrode that received the scan pulse shown in FIG. 4 (a) and the column electrode that received the video signal waveform shown in FIG. 4 (b). As soon as the switching transistor 11 turns ON during the period "t1", the liquid crystal layer 14 is charged so that the voltage at the display picture element electrode becomes "v" in any conventional circuit. When the switching transistor 11 turns OFF during a period from "t1" to "t2", charge stored in the liquid crystal layer 14 remains unaffected. When the amount of charge in the liquid crystal layer 14 is constant, the differential potential between the display picture element elctrode and the opposite electrode 15 remains constant even if the potential of the opposite electrode 15 varies. As a result, when the waveform shown in FIG. 4 (c) is applied to the opposite electrode 15, the potential of the display picture element electrode varies during a period from "t1" to "t2" in the same manner as the opposite electrode 15 shown in FIG. 4 (d). Next, when the switching transistor 11 turns OFF during a period "t2", the display picture element electrode is charged up to the $-v$ potential, and then the potential varies in the next cycle when the switching transistor 11 is again OFF in the same manner as the opposite electrode 15. As a result, a specific voltage waveform is generated in the display picture element electrode as shown in FIG. 4 (d). Simultaneously, the voltage shown in FIG. 4 (e) which is the differential voltage between the voltage waveforms of FIG. 4 (c) and (d) is applied to the liquid crystal layer 14. In other words, the drive circuit embodied by the present invention has made it possible to apply a specific voltage, equal to the difference between the video signal waveform and the voltage waveform of the opposite electrode 15, to the liquid crystal layer 14 when the switching transistor 11 turns ON. This means that when the polarity of both waveforms reverses, the liquid crystal layer 14 receives a voltage greater than that of the video signal waveform. In reference to FIG. 4 (c), a consideration is given to the case when the amplitudes "a" and "b" are equal to each other, in other words, a case in which the rectangular waveform is applied to the opposite electrode 15. During this period, even if the video signal is zero, a specific voltage corresponding to the amplitude value "a" is constantly applied to the liquid crystal layer 14, and therefore, in addition to the amplitude value "a", when video signal enters the liquid crystal layer, a specific video voltage dealing with each picture element will also be applied to each picture element additionally. FIG. 5 shows the relationship between the voltage applied to the liquid crystal display and the permeability. As is clear from FIG. 5, such voltages below the threshold value are not shown in the liquid crystal display. The video display will be performed within only such a range from the threshold voltage VT and the saturated voltage VS. As a result, when employing the drive method embodied by the present invention, by applying a rectangular waveform denoting the effective voltage value VT to the opposite electrode 15 and also by applying a video signal containing the maximum amplitude (VS−VT) to the column electrode, video signals can be stably displayed in the liquid crystal display device, and as a result, the new drive system embodied by the present invention effectively minimizes the power voltage and its consumption in the video signal processor circuit. For example, when a liquid crystal display with VS=3V and VT=2V of the amplitude is used, the new drive system embodied by the present invention effectively reduces the power voltage one-sixth (1V of (VS−VT) )the conventional method which normally requires 6V (VS×2) of the maximum amplitude and also power consumption of one thirty sixth, respectively. In addition, the drive method embodied by the present invention also features a capability to easily compensate for an uneven display contrast effect in the direction parallel with the column electrodes.

Now, for example, we'll consider a case in which a video signal VO that applies the same amplitude voltage to all the picture elements has been fed to the column electrodes, and then, due to the varied effect of the physical characteristics, liquid crystals of the first row picture elements receive enough voltage, but liquid crystals of the last row picture elements do not receive enough voltage, thus causing the display contrast to linearly vary between row electrodes. To compensate for this, a video signal having a constant amplitude value VO is applied to the column electrode, and at the same time, a specific waveform voltage shown in FIG. 4 (c) is applied to the opposite electrode 15. This allows the liquid crystals of the first row picture elements to receive a voltage containing (VO+a) of the effective value and the liquid crystals of the last row picture element to also receive a voltage containing (VO+b) of the effective voltage, respectively. Therefore, when the display contrast is uneven, the drive method embodied by the present invention first applies a specific voltage waveform shown in FIG. 4 (c) and then properly adjusts amplitudes a and b so that the varied effect of the display contrast can be easily compensated for. In addition, when the display contrast is uneven in the direction parallel with the row electrodes, the opposite electrode can be split into stripes in the direction vertical to the row electrodes, allowing a variety of voltage waveforms to enter the stripes, making it possible to compensate for these uneven display contrasts to some extent.

Figure 6:
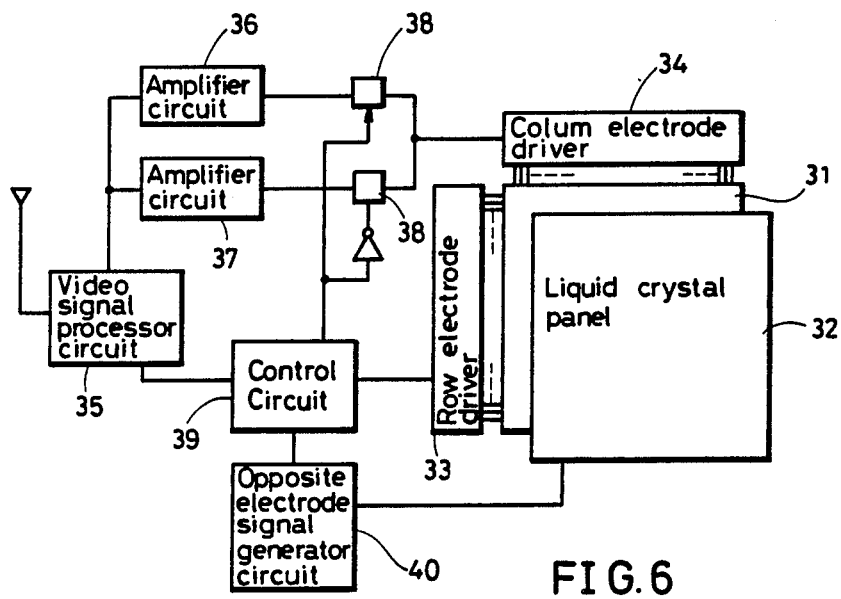
FIG. 6 shows the block diagram of the drive circuit as one of the preferred embodiments of the present invention.

FIG. 6 shows the block diagram of the drive circuit as one of the preferred embodiments of the present invention. The liquid crystal display panel is composed of the following: a transparent substrate 3 which is provided with semiconductive thin-film switching transistors 11 formed at each crossing of the row and column electrodes set in a matrix array and also the display picture element electrodes that are connected to the switching transistor 11; the other transparent substrate 32 containing the opposite electrodes 15 that are opposite from the display picture element electrodes; and the liquid crystal layer 14 inserted between these two substrates 31 and 32. The row electrode driver 33 and the column electrode driver 34 are respectively connected to the row electrodes and the column electrodes of the transparent substrate 31. The inverted and non-inverted amplifier circuits 36 and 37 are both connected to the video signal processor circuit 35 which converts the received video signals into a specific waveform suited for driving the liquid crystal. Switch 38 switches the video signals for delivery to the column electrode driver 34. The video signal processor circuit 35 is connected to the control circuit 39, to which the opposite electrode signal generator circuit 40 generating specific waveforms for the opposite electrodes 15 is connected. Video signals received by the video signal processor circuit 35 are converted into specific waveforms suited for driving liquid crystals before being delivered to the amplifier circuits 36 and 37 and the control circuit 39. The amplifier circuits 36 and 37 cause both the inverted and non-inverted video signals to be switched by switch 38 for every field, and then delivers these signals to the column electrode driver 34. The control circuit 39 outputs control signals that are delivered based on the field unit of the video signals for controlling the switching operation of switch 38. The control circuit 39 also controls the timing of the scan pulses output from the row electrode driver 33 to respective row electrodes. The opposite electrode signal generator circuit 40 being connected to the control circuit 39 outputs the control voltage so that a specific voltage corresponding to the threshold voltage VT of the liquid crystal layer 14 can be applied to the liquid crystal layer 14 as the effective value. In other words, when there is no voltage applicable to the column electrode, the control voltage is output so that the threshold voltage VT can be supplied to the liquid crystal layer 14. If the display effect is uneven, the drive method embodied by the present invention properly controls the voltage value applicable to the opposite electrodes according to locations where uneven display contrast exists and simultaneously compensates for the uneven display contrast.

Figure 7:
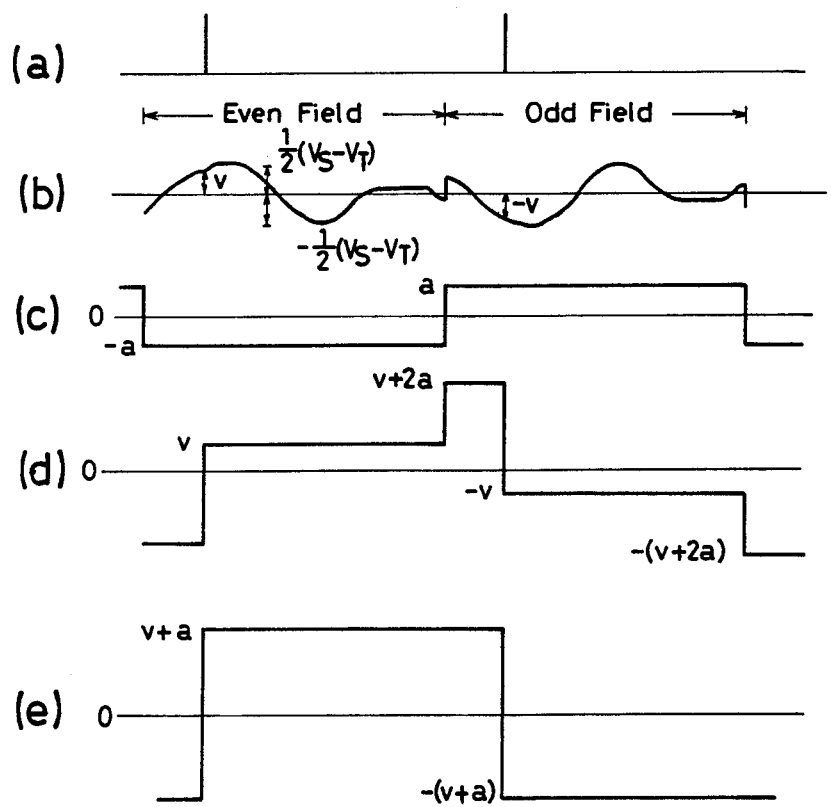
FIG. 7 shows examples of the drive waveforms of the drive circuit shown in FIG. 6.

FIG. 7 shows the typical waveforms sent from the drive circuit embodied by the present invention. FIG. 7 (a) and (b) respectively show the scan pulse and the video signal waveform. The video signal has been alternately inverted for every field, with a maximum amplitude of ½ (VS−VT). FIG. 7 (c) shows the voltage waveform applied to the opposite electrodes 15. It shows a specific rectangular waveform so that the threshold voltage VT can be applied to liquid crystals when the video signal level is minimum (i.e., when the level is −½(VS−VT) in every field). In this case, the amplitude "a" is set according to an equation $$a = VT + \left(\frac{VS - VT}{2}\right).$$

FIG. 7 (d) shows a specific voltage waveform applied to the display picture element electrodes, and (e) shows a specific voltage waveform applied to the liquid crystal layer 14, to which the voltage $$VT + \left(\frac{VS - VT}{2}\right) + V$$

beyond the threshold value is applied so that display can be eventually performed. If the display contrast is uneven, the opposite electrode signal generator circuit 40 outputs a specific waveform according to the uneven patterns, which is then delivered to the opposite electrodes 15 so that uneven effect of the display contrast can be compensated for properly.

As is clear from the above description, the drive circuit according to the preferred embodiment of the present invention effectively minimizes the amplitude of video signals being applied to either the row or column electrodes by applying a specific control voltage to the opposite electrodes, thus drastically reducing the power consumption. The drive circuit according to the preferred embodiment can also drive the liquid crystal display by properly compensating for an uneven effect of the display contrast through the circuit operations. As a result, the drive circuit thus embodied by the present invention is a quite useful technique for correctly driving a large-capacity matrix liquid crystal display device.

What is claimed is:
1. A liquid crystal display device comprising:
   a liquid crystal display including,
      row and column electrodes formed as a matrix array on a first substrate, a switching transistor formed at the intersection of each said row and column electrode, a display picture element electrode connected to each said switching transistor defining a display element, an opposed electrode formed on a second substrate at a position opposite from each said display picture element electrode, and a liquid crystal layer disposed between said display picture element electrodes and said opposed electrodes; and signal processing means connected to said liquid crystal display for providing a video signal, having fields of alternating positive/negative polarity to said column electrodes and for sequentially applying scan pulses to said row electrodes; and opposed electrode signal generator means for applying an alternating predetermined voltage in synchronism with the fields of alternating polarity of said video signal but of opposite voltage polarity thereto to said opposed electrodes to produce a sum voltage of said video signal and said alternating predetermined voltage across each said display element, said sum voltage applied to each said display element having a voltage greater than either said video signal supplied to that said display element or said alternating predetermined voltage.

2. A liquid crystal display device according to claim 1 wherein said opposed electrode signal generator means includes means for providing a specific rectangular waveform to said opposed electrodes so that when said video signal is not being provided to said column electrodes, a threshold voltage can be applied to said liquid crystal layer of each said display element.

3. A liquid crystal display device according to claim 1 wherein said opposed electrode signal generator means includes means for providing a specific voltage waveform to said opposed electrodes, in which said specific voltage waveform is varied to compensate for an unevenness of display contrast in the liquid crystal layer parallel to said column electrodes to render display contrast in the direction of said column electrodes even.

* * * * *